Oct. 30, 1956   F. D. BROWNHILL ET AL   2,768,525
TORQUEMETER
Filed Jan. 8, 1952   3 Sheets-Sheet 1
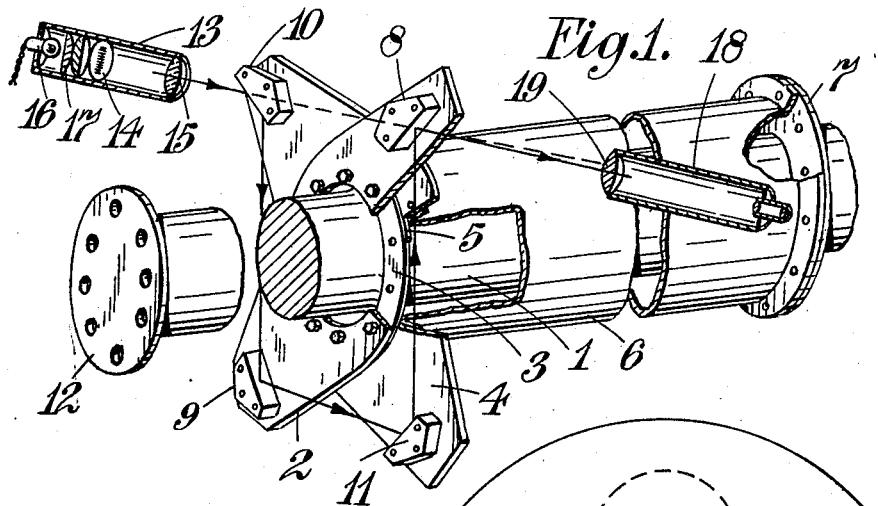
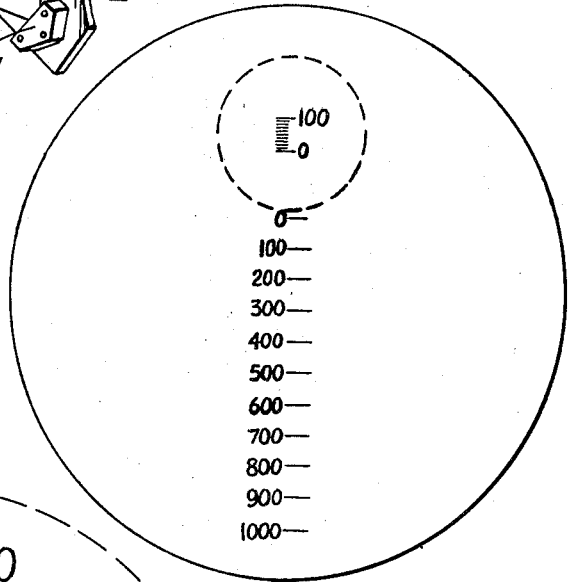
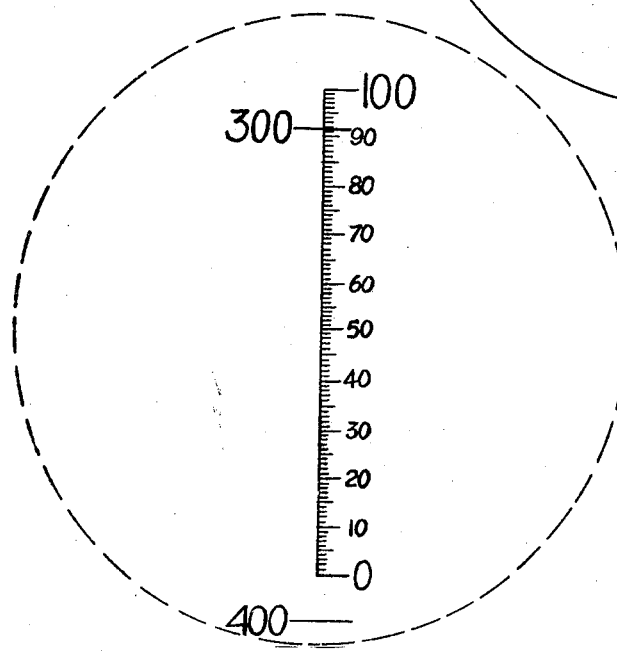
INVENTORS
F. D. BROWNHILL +
R. D. VAN MILLINGEN
By Mawhinney & Mawhinney

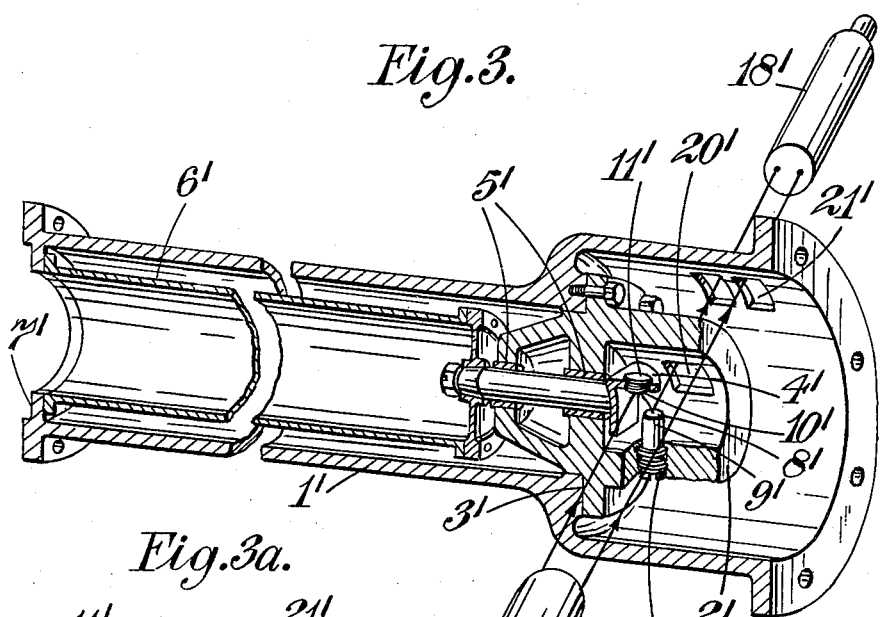
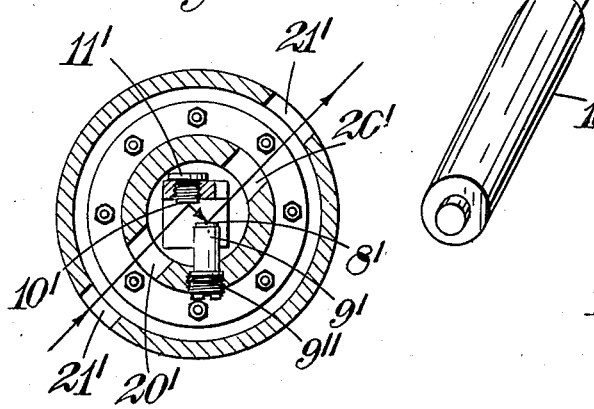
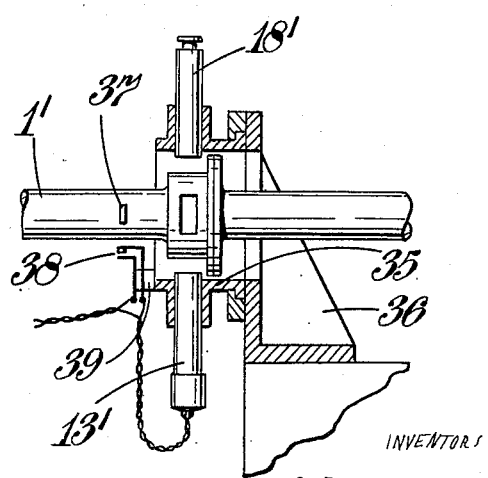
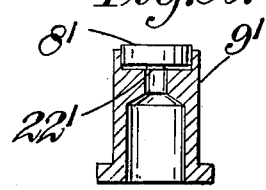
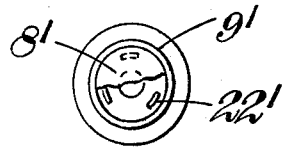

Oct. 30, 1956  F. D. BROWNHILL ET AL  2,768,525
TORQUEMETER

Filed Jan. 8, 1952  3 Sheets-Sheet 3

INVENTORS
F. D. BROWNHILL +
R. D. VAN MILLINGEN

By Mawhinney & Mawhinney

United States Patent Office 2,768,525
Patented Oct. 30, 1956

2,768,525

TORQUEMETER

Frank Denison Brownhill, Rugby, and Reuel Duncan van Millingen, Ravensthorpe, England Application January 8, 1952, Serial No. 265,484

Claims priority, application Great Britain January 8, 1951

7 Claims. (Cl. 73—136)

This invention relates to torquemeters.

The preferred object of the invention is to provide a method for ascertaining twists of elastic shafting of known torsional stiffness in the order of magnitude of 2° at speeds in the order of magnitude of 30,000 revolutions per minute on a scale of say 1000 divisions, enabling the torque transmitted by the said shafting to be read to about 1 part in 5000.

It is another main object of the invention to provide an instrument allowing the ascertaining of such angular relative displacements of the order of magnitude of 2° at speeds in the order of magnitude of 30,000 revolutions per minute on a scale of say 1000 divisions, enabling the ascertaining of such angular displacements to about 1 part in 5000, and preferably for ascertaining the torque transmitted by elastic shafting of known torsional stiffness by so metering the angular displacement (twist) produced by the said torque on the said shafting.

With these and other objects in view, we provide a torquemeter, the main feature of which consists in that it comprises in combination: an even number of plane mirrors alternately rigidly connected to two zones of the rotating body liable of relative angular displacement and set at angles relative to each other reflecting in the course of rotation a fixed collimated beam of light directed on to one of the said mirrors an even number of times alternately by mirrors rigidly connected to one or the other of the said zones, the final reflection being away from the said rotating body in a plane of rotation thereof.

Other features of the invention will become apparent from the following description of some embodiments thereof given by way of example with reference to the accompanying drawings, in which:

Fig. 1 is a perspective view, partly broken away, of a torquemeter instrument according to the invention;

Fig. 2 is an end view of a detail of Fig. 1 on an enlarged scale, and Fig. 2a is a detail of Fig. 2 on a scale still further enlarged.

Figure 5:
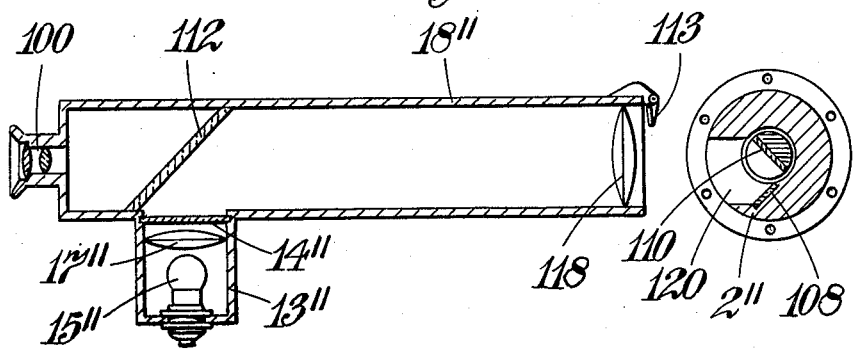

Fig. 3 is a perspective sectional view, partly broken away, of another torquemeter instrument according to the invention, Fig. 3a is a cross section of the embodiment of Fig. 3 in the plane of rotation through the center lines of items 13', 18', Fig. 3c is an end view and Fig. 3b is a longitudinal section of a detail of Fig. 3a on a larger scale, Fig. 4 shows in lateral elevation, partly in section, on a smaller scale a modified detail of the instrument according to Fig. 3 as adapted for measuring cyclic torque variations, Fig. 5 is a longitudinal section through a combined collimator and telescope device, and a cross section of a modified detail of the instrument according to Fig. 3a cooperating therewith, on a larger scale.

Figure 6:
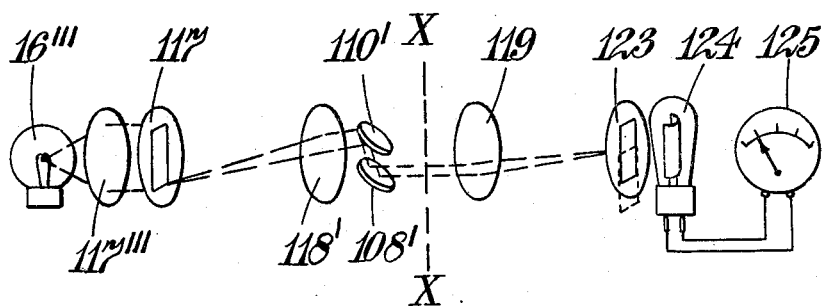
Figure 7:
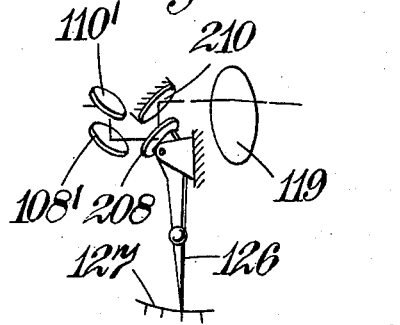

Fig. 6 is an optical diagram of the path of light in a modified embodiment of the instrument according to Fig. 3, measuring the intensity of the deflected beam of light, and Fig. 7 is a modified detail of the instrument of Fig. 6 showing mirror deflecting means for null-reading.

Referring to Fig. 1, a torsionally elastic shaft 1 carries near one end a plate 2 rigidly bolted to a flange 3 which is integral with the shaft 1. A second plate 4 is supported on the circumference of the flange 3 by an antifriction bushing 5, and is rigidly connected to the other end of the shaft 1 by means of a tube 6 and a flange 7 which is also integral with shaft 1.

Plate 2 carries a mirror 8, the plane reflecting surface of which is arranged radial to the axis of the shaft 1, and another mirror 9, the plane reflecting surface of which faces inwards towards the shaft 1, and similarly plate 4 carries one radial mirror 10 and one inward facing mirror 11. Torque is applied to a coupling 12 in a direction which is clockwise when looking at the coupling 12 in Fig. 1. The centres of the mirrors 8, 9, 10, and 11 lie in, and their surfaces are normal to a plane at right angles to the axis of rotation which also contains the optical axes of a collimator 13 and of a telescope 18.

The collimator 13 consists of a graticule or scale 14 of transparent lines on a dark ground placed at the exact focus of a lens 15 and illuminated by a lamp 16 through a condenser lens 17. With the shaft 1 in the position shown in Fig. 1, light from the collimator 13 strikes the mirror 10 an an angle of approximately 45° and is reflected by it on to and by the mirrors 9, 11 and 8 in that order. From the mirror 8 the light is reflected along the axis of the telescope 18 forming a real image of the graticule 14 at the exact focus of the object lens 19 of the telescope.

In other angular positions of the shaft 1 reached in the course of its rotation, light passes directly from the collimator 13 into the telescope 18 to form a real image identical in size with that formed by the light reflected in the manner described hereinabove. These two images coincide only when the mirrors are at angles relative to each other such that light passing from the collimator 13 to the telescope 18 by reflection on the mirrors 10, 9, 11, 8 suffers no angular deflection. Owing to the persistence of vision, both images appear to be continuous at speeds over about 200 revolutions per minute, and may be read one against the other.

For convenience in reading in this way, the graticule may take the form shown in Fig. 2, comprising a coarsely divided scale portion and a finely divided scale portion, the divisions of the said coarsely divided portion subtending equal angles of for example 0.4° at the lens of the collimator, and the extreme lines of the said finely divided scale portion subtending likewise the said angle. The distance between the uppermost division of the said coarsely divided portion and the lower extreme line of the said finely divided scale portion is made slightly larger than that between adjacent divisions of the said coarsely divided scale portion, say subtending an angle of 0.5°.

The uppermost division of the said coarsely divided scale portion is marked zero, the next one below: 100, then 200 and so on up to 1000, the figures being written preferably on the left hand side of the scale. The lowest and uppermost line of the finely divided scale portion, which is divided into 100 parts subtending equal angles, are numbered zero and 100 respectively, preferably on the right hand side of the scale.

Through the telescope 18 one observes the finely divided scale portion directly, the light bypassing the rotating mirrors, and the image of the coarsely divided scale portion, or part of it, by reflection in a box-like path.

The mirrors are set initially slightly out of parallel in the plane of rotation so as to bring the reflected image of the uppermost or zero line of the coarsely divided scale portion superimposed to the zero line of the directly observed image of the finely divided scale portion. This also removes the reflected image of the said finely divided scale portion from the field of view of the telescope.

Increasing torque changes the angle between the associated mirrors, since they are connected to opposite ends of the shaft 1, and the zero line of the coarsely divided scale portion appears to move upwards over the finely divided scale portion, the latter remaining stationary in the field of view. As the zero line of the coarsely divided portion reaches the top of the finely divided scale portion, it is replaced by the "One Hundred" line, which at the same time reaches the bottom of the finely divided portion, climbs up over the said finely divided portion, and so on, the reading always being the "Hundreds" of the division of the coarse scale portion actually superimposed to the finely divided portion and visible on the left hand side of the scale, plus the corresponding scale reading of the finely divided scale portion, the figures of which are on the right hand side of the scale. This is exemplified in Fig. 2a.

Another embodiment of a torquemeter instrument according to the invention is illustrated in Figs. 3, 3a to 3c. Here the position of the torque-carrying and the torque-free members is reversed, the latter being arranged inside the former. A hollow elastic shaft 1' of known torsional stiffness carries near a stiffened end portion a flanged body 2' rigidly bolted to an internal flange 3' integral with the shaft 1'. A bracket member 4' is supported in anti-friction bushes 5' coaxial with the shaft 1' and is connected to the remote end of this shaft by means of a tube 6' and flange 7' which is integral with the shaft 1'. The body 2' carries a mirror 8' mounted in a holder 9' which is held in place by a screwed plug 9'', while the member 4' carries a mirror 10' mounted in a screw holder 11'. The centers of the mirrors 8' and 10' lie in, and their reflecting surfaces are normal to, a plane at right angles to the axis of rotation, and their reflecting surfaces face each other, and are substantially parallel to each other, and are about half their diameter apart. A line joining their centers passes through the axis of rotation of the shaft and makes an angle of about 45° with their reflecting surfaces. Ports 20', 21' in the shaft 1' and in the body 2' allow light from the collimator 13' to reach the mirror 8' at an angle of about 45°, and after reflection onto and by the mirror 10' to emerge on the other side of the shaft 1' through the opposite ports 20', 21' of the body 2' and shaft 1', and to enter a telescope 18' together with another beam of light which passes directly through the ports 21' in the shaft 1' just beyond the end of the body 2' to form a direct image of the graticule or other illuminated object of the collimator 13'.

The mirrors 8' and 10' rest in their holders 9', 11', respectively, on three pips 22', as shown in Fig. 3b for the mirror 8' and holder 9'. In the case of the mirror 10' and holder 11' these three pips are arranged to define a plane as nearly as possible parallel to the axis of the shaft 1', but in the holder 9' they are purposely formed slightly out of square with its flange. The holder 9' may then be rotated about its axis before clamping the screw plug 9'', until the reflecting surfaces of the mirrors 8' and 10' are exactly parallel to each other in the axial direction, thus avoiding any sideways movement of the reflected image as the shaft 1' rotates.

In the embodiment of Figs. 3, 3a to 3c there are only two reflections of the beam of light, giving an optical deflection of 2° per 1° of twist instead of 4° per 1° as in the four-mirrored embodiment according to Fig. 1.

Referring now to Fig. 4 the collimator 13' and the telescope 18' are both fitted into a trunnion 35 which is journalled coaxially to the rotatable shaft 1' in a fixed bracket 36, so that the angular position of the said collimator 13' and telescope 18' can be adjusted relative to the rotatable shaft 1'.

A cam 37 may be arranged on the shaft 1' to cooperate with a switch 38 in the circuit of the lamp of the collimator 13', which switch is also attached to the trunnion 35 by means of an insulating block 39. This switch 38 is periodically closed and opened by the cam 37 in synchronism with the rotation of the shaft 1' whereby a stroboscopic effect of the collimated light is produced. By adjusting the angular position of the collimator 13' and telescope 18' relative to the rotating shaft 1', the torsional deflections thereof are observed for a particular angular position of the said shaft, which allows cyclic torque variations occurring on the shaft 1' to be ascertained by meaning the torque at various angular positions around its axis of rotation.

Referring now to Figs. 5, the collimator and telescope are combined into a single instrument: the condenser lens 17'' is arranged between the source of light 15'' and the graticule 14'', and this assembly 13'' is arranged laterally on the telescope 18'' between the eye piece 100 and the object lens 119 thereof, graticule 14'' being at the exact focus of lens 118 measured along a path including reflection through 90° by a half-silvered mirror 112, arranged inclined at 45° between the eye piece 100 of the telescope 18'' and the assembly 13''. A small plane mirror 113 faces part of the object lens 118 of the telescope 18''. The mirror 108 is attached to the rigid body 2'' (which corresponds to the rigid body 2' of Figs. 3, 3a–c) adjacent a port 120, and the mirror 110 is attached substantially at right angles to the mirror 108 to a holder which is connected through the tube 6' (Fig. 3) to the opposite end flange 7' of the torsionally resilient shaft 1'.

Light from the assembly 13'' is reflected by the half silvered mirror 112 through the object lens 118 of the telescope 18'' which serves to collimate it. Part of this light is reflected directly by the mirror 113 and passes through the half silvered mirror 112 back towards the eye piece 100 of the telescope 18''. Another part of the collimated light falls in certain angular positions of the rotating body, such as the one shown in Fig. 5, on to mirror 108, is reflected by the same on to the mirror 110 and by the latter through the object lens 118 and the half silvered mirror 112 into the eye piece 100 of the telescope 18''. The real image of the graticule 14'' can accordingly be observed in the same field of vision reflected directly by the stationary mirror 113, and after an even number of reflections by the rotating mirrors 108, 110.

The angular position of the mirrors 108, 110 relative to one another is varied as described for the mirrors 8, 10 of the embodiment according to Figs. 3, 3a–c, and their angular relative displacements can be measured accordingly as described.

Referring to Fig. 6, the light from a source 16''' is passed through a collimator comprising a lens 117''', a blind 117, having for example a rectangular slot at the focus of an object lens 118', and is projected on to the rotating mirror 110'. From there it is reflected on to the other rotating mirror 108', which is liable to undergo the small angular displacements to be measured relative to the mirror 110', and is reflected by the said mirror 108' into a refocussing assembly comprising the object lens 119 and another blind 123, at the focus thereof, having a rectangular slot corresponding to that of the blind 117, and thereafter falls upon a photoelectric cell 124 connected to a circuit including a microammeter 125.

The two mirrors 108', 110' are so set relative to one another that the image of the rectangular slot of the blind 117 coincides with the rectangular slot of blind 123 so that a maximum amount of light falls on to the photoelectric cell 124. When, however, the two mirrors undergo an angular displacement relative to one another, the image of the slot of blind 117 is partly off-set relative to the slot of blind 123 as shown in Fig. 6 in dotted lines, and the amount of light falling on to the photoelectric cell 124 is reduced accordingly.

The dial of the microammeter 125 can be so calibrated as to allow the direct reading of the angle of deflection of the mirrors 108′, 110′ relative to one another, or of the torque causing such deflection.

Fig. 7 shows adjustable deflecting means, in effect a box sextant, comprising a stationary mirror 210, an adjustable mirror 208 substantially parallel to it, and a pointer and scale 126, 127.

By including such deflecting means for example in plane X—X of Figure 6, the real image may be restored to its original position, preferably one giving only a small deflection of microammeter 125. The corresponding angular adjustment of mirror 208 is then a measure of the angular displacement of the rotating mirrors.

While we have described and illustrated what may be considered typical and particularly useful embodiments of our invention, we wish it to be understood that we do not limit ourselves to the particular details and dimensions shown and described, for obvious modifications will occur to a person skilled in the art.

What we claim as our joint invention and desire to secure by Letters Patent, is:

1. A torquemeter comprising in combination: a rotatable hollow shaft having a portion of known torsional stiffness, a bracket body mounted freely angularly adjustable about the axis of the said hollow shaft inside the same at one end of the said portion and a torsion-free connecting member coaxial to the shaft connecting the said bracket body to the other end of the said portion, two mirror holders each having a plane mirror at its end, one of the said mirror holders being fitted into the said bracket body and the other to the end of the said portion adjacent to it, the said holders having their axes substantially parallel to one another in the same transverse plane and the two mirrors facing one another with an offset in the said transverse plane, ports being provided in the said shaft in the said transverse plane aligned at about 45° to the planes of said mirrors, a collimator comprising a source of light, a condenser lens, a graticule and an object lens having its optical axis directed on to one of the said mirrors through some such ports in the said transverse plane thereof, and a telescope having its optical axis substantially in alignment with that of the said collimator and allowing to observe in the same field of vision the virtual image of the said graticule formed by said object lens after an even number of reflections by the said revolving mirrors, and also directly through some others of said ports.

2. A torquemeter comprising in combination: a hollow shaft having a comparatively torsionally resilient long portion of known torsional stiffness and a comparatively stiff short portion, external flanges at both ends and an internal flange at the transition between the said two portions, a flanged hollow body bolted to the said internal flange, a bracket journalled coaxially to said shaft in the said flanged body, a connecting tube arranged coaxially to and within the said torsionally resilient portion of the shaft and connected at one end to the other end of the said resilient portion and at the other end connected to said bracket, two mirror holders each having a plane mirror at its end, one of the said mirror holders being fitted into the said bracket and the other into the said hollow body with their axes substantially parallel in the same plane transverse to the axis of the said shaft and the two mirrors facing one another with an off-set in the said transverse plane, ports being provided in the said stiff portion of the said shafting and in the said flanged hollow body aligned at about 45° to the planes of the said mirrors, a collimator comprising a source of light, a condenser lens, a graticule, and an object lens, having its optical axis directed on to one of the said mirrors through some such ports in the said plane of rotation thereof, and a telescope having its optical axis substantially in alignment with that of the said collimator and allowing to observe in the same field of vision the virtual image of the said graticule formed by said object lens after an even number of reflections by the said revolving mirrors and also directly through some others of said ports.

3. A torquemeter comprising a hollow elastic torque-carrying shaft member, a body rigidly mounted in said shaft member at a first location, a bracket member mounted in said body to be angularly adjustable in said body coaxially with the axis of rotation, torsion-free means extending coaxially within said shaft member and connecting said bracket to said shaft member at a second location axially spaced from said first location, and a pair of plane mirrors, one mirror thereof being rigidly mounted on the said body and the other mirror being rigidly mounted on the said bracket member, the planes of said mirrors being substantially parallel to and facing one another and parallel to the axis of rotation, having their centers in a common plane transverse to the axis of rotation, a line joining their centers making an angle of about forty-five degrees with their reflecting surfaces and passing through said axis of rotation, ports being provided both in said body and in said shaft member disposed about lines normal to the said line joining the mirror centers and lying in the said transverse plane.

4. A torquemeter comprising a hollow elastic torque-carrying member, a body secured in said member at a first point in its length, a torque-free member secured at one end to said torque-carrying member at a second point in its length, said torque-free member extending coaxially within said torque-carrying member and having its other end adjacent said body, a bracket rotatably mounted in said body and secured to said other end of the torque-free member, a first mirror rigidly mounted in said body, a second mirror rigidly mounted on said bracket, said mirrors being substantially parallel to the axis of rotation and on opposite sides of the axis, a line joining the centers of the mirrors making an angle of about 45 degrees with the reflecting surfaces of the mirrors and passing through the axis, ports in said torque-carrying member and in said body aligned with each of said mirrors, an external stationary light source producing a collimated beam of light and in some angular positions of the torque-carrying member directing a beam of light through the ports to be reflected by the mirrors in sequence, and external stationary measuring means receiving the finally reflected beam of light and adapted to permit measurement of the change in direction of the finally reflected beam on change of torque in said torque-carrying member.

5. A torquemeter as claimed in claim 4, wherein said source comprises a collimating lens, a graticule located at the focus of the lens and a lamp illuminating the graticule, said graticule having a first and coarsely divided scale and a second finely divided scale spaced from the first scale and having a length equal to the length of a division of said coarse scale, and said measuring means receives a second and direct beam of light from said light source in addition to the said finally reflected beam of light, said mirrors being inclined relative to one another so that the reflected image of a division of the first scale in the observing means is super-imposed on the direct image of the second scale and travels along it as the torque in said torque-carrying member varies.

6. A torquemeter as claimed in claim 4, wherein said light source includes means affording a shaped aperture defining the light beam, and said measuring means comprise means affording a correspondingly-shaped aperture, and a photo-electric sensing device receiving the finally reflected beam through said correspondingly-shaped aperture.

7. A torquemeter as claimed in claim 6, wherein the measuring means also comprises non-rotating mirror means which receives the beam finally reflected from the mirrors on the torque-carrying member and which is adjustable to direct a variable proportion of the beam towards said correspondingly-shaped aperture.

References Cited in the file of this patent

UNITED STATES PATENTS

| | | |
|---|---|---|
| 1,613,262 | Aoki | Jan. 4, 1924 |
| 1,624,430 | Parsons | Apr. 12, 1927 |
| 1,850,807 | Pavish | Mar. 22, 1932 |
| 2,007,220 | Smith | July 9, 1935 |
| 2,073,206 | Guthrie | Mar. 9, 1937 |
| 2,136,223 | Thomas | Nov. 8, 1938 |
| 2,402,856 | Turrettini | June 25, 1946 |